(12) United States Patent
Sakata et al.

(10) Patent No.: US 6,292,937 B1
(45) Date of Patent: Sep. 18, 2001

(54) PROGRAM CONVERSION DEVICE FOR TRANSLATING AN OBJECT-ORIENTED LANGUAGE SOURCE PROGRAM

(75) Inventors: Toshiyuki Sakata, Osaka; Seiichi Urushibara, Kyoto; Kiyokazu Yamanaka, Ashiya; Hirohisa Tanaka, Higashiosaka, all of (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 0 days.

(21) Appl. No.: 09/356,229

(22) Filed: Jul. 16, 1999

(30) Foreign Application Priority Data

Jul. 22, 1998 (JP) ................................................ 10-206966

(51) Int. Cl.[7] ...................................................... G06F 9/45
(52) U.S. Cl. ...................................................... 717/5; 717/11
(58) Field of Search ................................ 717/5, 4, 6, 8, 717/11, 10; 707/101, 104, 103 Y; 711/202, 204

(56) References Cited

U.S. PATENT DOCUMENTS

| | | | |
|---|---|---|---|
| 5,481,708 | * 1/1996 | Kukol | 717/9 |
| 5,790,861 | * 8/1998 | Rose et al. | 717/5 |
| 5,815,718 | * 9/1998 | Tock | 717/5 |
| 5,966,542 | * 10/1999 | Tock | 717/11 |

FOREIGN PATENT DOCUMENTS

| | | |
|---|---|---|
| 9179738 | 7/1997 | (JP) . |
| 1011291 | 1/1998 | (JP) . |

OTHER PUBLICATIONS

Jaakko Jarvi, "Compiler Time Recursive Objects in C++," Proceedings Tools 27, IEEE Technology of Object–Oriented Languages, Sept. 22–25, 1998, pp. 66–77.*

* cited by examiner

*Primary Examiner*—Tuan Q. Dam
(74) *Attorney, Agent, or Firm*—Price and Gess

(57) ABSTRACT

A program conversion device includes a formal initialization expression generating unit, an actual initialization expression generating unit, and an object generation statement translating unit. The formal initialization expression generating unit focuses on a definition of an object generation function written in a source program and generates, if the object generation function does not perform any processing other than setting values in member variables of an object, a formal initialization expression which is the member variables represented by formal parameters. The actual initialization expression generating unit focuses on an object generation statement and generates, if a formal initialization expression that corresponds to an object generation function to be invoked by the object generation statement has been generated, an actual initialization expression. If the generated actual initialization expression is member variables represented by constants, the object generation statement translating unit translates the object generation statement in focus not into a subroutine call code sequence to invoke the corresponding object generation function, but into object data that has the constants of the actual initialization expression.

7 Claims, 16 Drawing Sheets

FIG. 1

```
class X {
    int x;
    int y;
    int z;
public:
    X(int a, int b) {x=a; y=b; z=a*b;}   //OBJECT GENERATION FUNCTION
};
const X obj(2,3);                         //OBJECT GENERATION STATEMENT
```
//CLASS X DEFINITION

FIG. 2

```
. section RAMAREA          ;; PLACE DATA IN RAM AREA obj : 12

. section END
. section TEXT
    mov    &obj, R0         ;;SET ADDRESS FOR OBJECT TO BE GENERATED
    mov    #2, R1           ;;SET FIRST PARAMETER
    mov    #3, R2           ;;SET SECOND PARAMETER
    call   X                ;;SUBROUTINE CALL FOR OBJECT GENERATION FUNCTION
. section END
```

FIG. 11

```
section ROMDATA          ;; PLACE DATA INTO ROM AREA
    obj : 2:4, 3:4, 6:4
section END
```

FIG. 12

```
class X {
    int x;
    int y;
    int z;
  public:
    X(int a, int b) {x=a; y=b; z=a*b;}    //OBJECT GENERATION FUNCTION
};
class Y {                                  //CLASS Y DEFINITION
    X obj;                                 //OBJECT MEMBER
    int n;
  public:
    Y(int i)
      : obj(i,3)                           //OBJECT GENERATION FUNCTION
      {n=i*2;}                             //OBJECT GENERATION STATEMENT
};
```
//CLASS X DEFINITION

FIG. 14

```
class X {
    int x;
    int y;
    int z;
public:
    X(int a, int b) : x(a), y(b), z(a*b) {}   //OBJECT GENERATION FUNCTION
};
class Y {
    X obj;
    int n;
public:
    Y(int i) : obj(i, 3), n(i*2) {}   //OBJECT GENERATION FUNCTION
};                                      AND ITS DEFINITION
```

//CLASS X DEFINITION

//CLASS Y DEFINITION

FIG. 15

```
class TextButton_RAM;

class Point {      //CLASS TO INDICATE POSITION
   int x;
   int y;
public:
   Point(int a, int b) :x(a), y(b) {}
};

class TextButton {              //CLASS TextButton
   int    id;                   //OBJECT ID
   int    parent_id;            //PARENT OBJECT ID
   Point  position;             //POSITION INFORMATION
   int    size;                 //SIZE INFORMATION
   TextButton_RAM *textButton_RAM;   //DATA WITH VALUE THAT CHANGES DURING PROGRAM EXECUTION
public:
   //CONSTRUCTOR
   TextButton(int i, int pi, int x, int y, int s, TextButton_RAM * dp);
   id(i), parent_id(pi), position(x, y), size(s), textButton_RAM(dp) {} virtual void draw();      //FUNCTION FOR DRAWING BUTTON
        . . .                //THE REST OMITTED
};
//button #1
extern TextButton_RAM tram;
extern const TextButton b1(1, 0, 7, 7, 10, &tram);   //OBJECT GENERATION STATEMENT TO GENERATE const OBJECT TextButton b1
```

FIG. 16

```
;; 28-BYTE AREA RESERVED IN RAM AREA TO STORE OBJECT b1
.bss        SECTION
            ALIGN   4                   ;; 4-BYTE ALIGNMENT
            GLOBAL  _b1
_b1         DS      28

;; CODE STORED IN CODE AREA TO INITIALIZE OBJECT b1
.text       SECTION

;; CONSTRUCTOR FOR CLASS Point
__ct__5Pointii
            mov     D0, (A0)            ;; SET position.x
            mov     D1, (4, A0)         ;; SET position.y
            ret ;; CONSTRUCTOR FOR CLASS TextButton
__ct__10TextButtoniiiiiP14TextButton_RAM
            movm    [A2,A3],(SP)
            add     -4,SP
            mov     A1,A3
            mov     A0,A2
            mov     D0,(4,A2)           ;; SET VALUES IN id
            mov     D1,(8,A2)           ;; SET VALUES IN parent_id
            mov     12,A0
            add     A2,A0
            mov     (16,SP),D0
            mov     (20,SP),D1
            call    _0__ct__5Pointii    ;; SET VALUES IN position
            mov     (24,SP),D0
            mov     D0,(20,A2)          ;; SET VALUES IN size
            mov     A3,(24,A2)          ;; SET VALUES IN textButton_RAM
            mov     __vt$10TextButton,D0
            mov     D0,(a2)             ;; SET VIRTUAL FUNCTION TABLE
            mov     A2, A0
            ret ;; FUNCTION TO INITIALIZE OBJECT b1
__GLOBAL_$I00$__Fv
            add     -16, SP
            mov     7,D0
            mov     D0,(4,SP)
            mov     D0,(8,SP)
            mov     10,D0
            mov     D0,(12,SP)
            mov     _b1, A0
            mov     1,D0
            clr     D1
            mov     _tram, A1
            call    _0__ct__10TextButtoniiiiiP14TextButton_RAM
            ret
```

FIG. 17

```
;; OBJECT b1 IS TO BE STORED IN 28-BYTE ROM AREA
.rodata     SECTION
    ALIGN   4                      ;; 4-BYTE ALIGNMENT
    GLOBAL  _b1
_b1 DD      _vt$10TextButton       ;; POINTER TO VIRTUAL FUNCTION TABLE
    DD      0x1                    ;; id
    DD      0x0                    ;; parent_id
    DD      0x7                    ;; position.x
    DD      0x7                    ;; position.y
    DD      0xa                    ;; size
    DD      _tram                  ;; TextButton_RAM
```

;; NO CODE IS GENERATED TO INITIALIZE OBJECT b1

PROGRAM CONVERSION DEVICE FOR TRANSLATING AN OBJECT-ORIENTED LANGUAGE SOURCE PROGRAM

BACKGROUND OF THE INVENTION

1. Field of the Invention

The present invention relates to a program conversion device that translates a source program into a machine language program and more specifically to a program conversion device for translating a source program that is written in an object-oriented language and contains object generation statements.

2. Description of the Prior Art

In object-oriented languages (OOL), objects (also called instances) need to be generated prior to use. This is achieved by object generation statements. When an object is generated using an object generation statement, an object generation function, which is one of member functions of the object, is invoked. In this way, an object generation statement invokes an object generation function to generate an object.

Usually, an object generation function is designed to initialize member variables of an object.

The following describes a conventional program conversion device that translates a source program written in C++, which is an OOL, into a machine language program.

FIG. 1 shows a part of a source program written in C++ that is made up of a definition of class X and an object generation statement used to generate an object of class X. The definition of class X contains an object generation function.

In C++, an object generation function is called a constructor and contains the name of its class. In the figure, "X (int a, int b)" represents an object generation function of class X. An object generation statement is written as a declaration statement for an object. In the figure, the object generation statement represented by "const X obj (2, 3);" is the declaration statement to generate object "obj" of class X. "(2, 3)" in "const X obj (2, 3);" denotes two actual parameters to be passed to the object generation function, and "const" denotes a qualifier showing that the values of object "obj" do not change after the object is generated. Hereafter, such an object whose values are invariable is called a "const object".

Here, note that object "obj" is a global object to which functions and other objects can refer and therefore should be placed in a memory during execution of the machine code that results from the translation of the source code.

The program conversion device, i.e., compiler, which translates a source program into a machine language program, generates a machine language program executable by a certain type of a processor.

In translating a source program into a machine language program for a microcomputer built into a household electrical appliance, a program conversion device translates data and procedures written in the source program respectively into data and codes, the resulting data being assigned a storage location attribute indicating either a ROM area or a RAM area, and the codes being assigned a storage location attribute indicating a ROM area. The RAM area refers to a memory area from which and into which data can be read and written, while the ROM area refers to a memory area from which data can be read only. Here, a storage location attribute indicating that data is to be placed into a ROM area is hereafter called a ROM attribute, and a storage location attribute indicating a RAM area is called a RAM attribute.

The machine language program outputted from the program conversion device is executed by a certain type of a processor under the control of an operating system (OS) or the like. The data and codes in the machine language program are placed in either a ROM or RAM area according to the storage location attributes assigned to the data and codes.

Conventional program conversion devices translate an object generation statement like that shown in FIG. 1 into object data and a code sequence including a subroutine call instruction that invokes an object generation function. Here, the object data refers to a group of the member variables of the object, and the code sequence including a subroutine call instruction to invoke an object generation function is hereafter called a subroutine call code sequence.

The conventional program conversion device always assigns the RAM attribute to the object data, and the ROM attribute to the subroutine call code sequence. This is because values can be dynamically set in member variables of an object during the execution of the object generation function invoked when the object is generated. This is the same even when a const object is generated.

FIG. 2 shows machine code that has been generated by a conventional program conversion device as a result of the translation of the object generation statement in the source program shown in FIG. 1. This machine code therefore is a part of a machine language program generated as a result of the translation of the source program. For ease of explanation, the machine language is represented by mnemonic code in the figure, and translation result of the object generation function shown in FIG. 1 is omitted in FIG. 2. The machine code between ".section RAMAREA" and the first ".section END" indicates data assigned the RAM attribute, and "obj:12" indicates that object "obj" is 12 bytes. Accordingly, a 12-byte RAM area is reserved for the execution of the machine language program.

The code sequence between ".section TEXT" and the second ".section END" in the figure is a subroutine call code sequence assigned the ROM attribute. In this subroutine call code sequence, "mov &obj, R0" represents an instruction to place the address of object "obj" into register R0, and "mov #2, R1" and "mov #3, R2" represent instructions to place parameters "2" and "3" into registers R1 and R2. "call X" indicates a subroutine call instruction to invoke the object generation function.

In this way, the conventional program conversion device translates an object generation statement in a source program into a subroutine call code sequence that unconditionally invokes the object generation function, and object data assigned the RAM attribute.

Generally, a machine language program of a larger code size requires a large memory for its execution, which raises execution cost. Accordingly, the code size of the machine language program should be minimized to lower the execution cost.

Also, in microcomputers to be built into household electrical appliances, the cost of RAM can be up to four times the cost of ROM. Accordingly, it is preferable for a program conversion device to assign the ROM attribute rather than the RAM attribute to as much data as possible.

SUMMARY OF THE INVENTION

In view of the above problems, the present invention aims to provide a program conversion device that translates a source program written in an OOL into a machine language program that involves a low execution cost by reducing a code size of the machine language program to be generated and/or a quantity of translated data that has the RAM attribute.

Points to be Focused for Improvements

In order to achieve the above aims, it is focused in the present invention that under certain circumstances execution results of object generation functions can be determined during translation from a source program into a machine language program, not during execution of the machine language program.

When translating an object generation statement that generates a global object and that invokes an object generation function that does not perform processing other than setting constant values in member variables of the object, it is possible to calculate the object data, which is the execution result of the object generation function in the conventional technique, as the translation result of the object generation statement.

Accordingly, if such an object generation function is to be invoked by an object generation statement, the program conversion device of the present invention translates the global object generation statement into object data only. In this way, unlike a conventional program conversion device that unconditionally translates such an object generation statement into object data and a subroutine call code sequence to invoke the object generation function, the program conversion device of the present invention generates a machine language program with a reduced size.

When the object generation statement can be translated into object data only and generates a const object, the memory location that stores this object data will never be updated.

As a result, the program conversion device of the present invention translates an object generation statement that generates a global const object into object data with the ROM attribute.

Accordingly, compared with the conventional program conversion device that translates every object generation statement that generates a const object into data with the RAM attribute as well as a subroutine call code sequence with the ROM attribute, the program conversion device of the present invention is capable of translating, under the certain conditions, object generation statements into data with the ROM attribute and thus reduces data with the RAM attribute.

Constructions of the Invention

In order to achieve the above aims, a program conversion device in the present invention converts a source program written in an object-oriented language into a machine language program, the program conversion device including: a detecting unit for detecting in the source program an object generation statement that invokes an object generation function to generate an object; a judgement unit for judging whether execution of the object generation function invoked by the detected object generation statement would involve processing other than statically setting values in member variables of the object generated using the object generation statement; a member variable value calculation unit for calculating, if the execution of the object generation function is judged to not involve processing other than statically setting the values in the member variables, the values that would be set in the member variables if the object generation function was executed; and a converting unit for converting the object generation statement into data that is of a same size as a total size of the member variables and that is the values calculated by the member variable value calculation unit.

With the above program conversion device, the judgement unit judges whether the invoked object generation function would involve processing other than statically setting values in member variables of the object. Here, "statically setting values in member variables of the object" means setting constant values in the member variables by performing operations, wherein the constant values can be obtained by calculation even before the machine language program is actually executed. Note that the above operations include making a judgement and performing a branch, but exclude invoking a service of the OS and inputting/ outputting. Address values that can be specified before the execution of the machine language program, such as an address whose value is predetermined, are also considered to be constant values.

Here, if an object generation function does not involve "processing other than statically setting values in member variables", this means that the values set in the member variables can be found from parameters passed to the object generation function by the object generation statement if the object generation statement contains parameters, and processing performed by any other object generation functions invoked by the object generation function.

With the above construction, the program conversion device directly translates an object generation statement into object data that is the values produced when the object generation function is invoked and executed, not into a subroutine call code sequence to invoke the object generation function. As a result, the program conversion device is capable of generating a machine language program whose code size is reduced by the code size conventionally used by the subroutine call code sequence. This reduced code size of the machine language program also improves the processing speed of the program conversion device.

Here, the judgement unit may include: a formal member variable value expression generating unit which, when the object generation function invoked by the detected object generation statement does not call another function, generates, if possible, a formal member variable value expression that expresses each value to be set in the member variables using one of (a) constants and formal parameters given in a definition of the object generation function, and (b) formal parameters only; an actual member variable value expression generating unit for generating, if a formal member variable value expression corresponding to the detected object generation statement has been generated by the formal member variable value expression generating unit, an actual member variable value expression by replacing formal parameters in the formal member variable value expression with actual parameters contained in the object generation statement; and a constant value detection unit for detecting whether the actual member variable value expression is represented by constants, and if the constant value detection unit detects that the actual member variable value expression is represented by constants, the judgement unit may judge that the execution of the invoked object generation function would not involve processing other than statically setting values in member variables of the object.

With the above construction, when a plurality of object generation statements call a single object generation function, once the formal member variable value expression generating unit generates a formal member variable value expression for one of the object generation statements, the formal member variable value expression can be used to generate actual member variable value expressions corresponding to other object generation statements. As a result, when a source program contains many object generation statements that invoke the same object generation function, the judgement unit can judge whether each object generation statement needs to be translated into a subroutine call code sequence to invoke the corresponding object generation function without needlessly repeating the processing of the formal member value expression generating unit.

Here, if a definition of the invoked object generation function includes statements other than assignment statements that set values in member variables of the object, the judgement unit may judge that the execution of the object generation function would involve processing other than statically setting values in the member variables.

With this construction, the judgement as to whether an object generation statement need be translated into a subroutine call code sequence to invoke the corresponding object generation function can be made by simply judging whether the object generation function contains statements other than the assignment statements. As a result, the program conversion device can make the above judgement faster.

Here, if the definition of the object generation function invoked by the detected object generation statement contains a second object generation statement that invokes a second object generation function which would not involve processing other than statically setting values in member variables of an object generated using the second object generation statement, the judgement unit may regard the second object generation statement as an assignment statement to make the judgement.

For this construction, even when the definition of the object generation function invoked by the detected object generation statement includes another object generation statement, the present program conversion device translates the detected object generation statement not into a subroutine call code sequence to invoke the object generation function but into object data only under the predetermined condition.

Here, the object-oriented language may be C++, and the object generation function in the source program may be a constructor composed of constructor initializers and a function body, wherein if the function body of the invoked object generation function is an empty statement, the judgement unit may judge that the execution of the object generation function would not involve processing other than statically setting values in member variables of the object.

For this construction, the present program conversion device makes the judgement as to whether each object generation statement need be translated into a subroutine call code sequence to invoke the object generation function simply by judging if the fct-body of the invoked object generation function is an empty statement. As a result, the program conversion device is capable of making the above judgement faster.

Here, the program conversion device may further include a consistency judgement unit for examining the object generation statement to judge whether values of an object generated by the object generation statement will not change, the object generation statement having been detected by the detecting unit, and if the consistency judgement unit judges that values of an object will not change, the converting unit may convert the object generation statement into data having an attribute indicating that the data should be placed into a ROM area, and if the consistency judgement unit judges that values of an object will change, the converting unit may convert the object generation statement into data having an attribute indicating that the data should be placed into a RAM area.

For the above construction, under the predetermined condition the program conversion device converts an object generation statement that generates a const object into data having an attribute to be placed into a ROM area. As a result, the machine language program generated by the present program conversion device requires less RAM during its execution. As the generated machine language program is often executed by microcomputers built into other devices and generally the RAM of such microcomputers costs more than the ROM, the execution cost of the machine language program generated by the present program conversion device becomes lower than that of machine language program generated by a conventional program conversion device.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1 shows a part of a source program written in C++ that includes a class X definition containing an object generation function and an object generation statement to generate an object of class X;

FIG. 2 shows machine code that has been generated as a result of the translation of the object generation statement in the source program shown in FIG. 1 by a conventional program conversion device;

FIG. 11 shows translation result obtained by the processing in step S604 of FIG. 10 for the object generation statement shown in FIG. 1;

FIG. 12 shows a part of a source program written in C++ that includes definition of an object generation function of class X and definition of an object generation function of class Y, wherein the object generation function definition of class Y contains an object generation statement that generates an object of class X;

FIG. 14 shows a source program where every object generation function in the source program shown in FIG. 12 is written as a constructor composed of a function body and constructor initializers;

FIG. 15 shows an example of a source program written in C++;

FIG. 16 shows machine code generated by the conventional program conversion device as a result of translating the source program in FIG. 15; and FIG. 17 shows machine code generated by program conversion device 100 as a result of translating the source program in FIG. 15.

DESCRIPTION OF THE PREFERRED EMBODIMENT

The following describes an embodiment of the present invention with reference to figures.

Construction of Program Conversion Device 100

Figure 3:
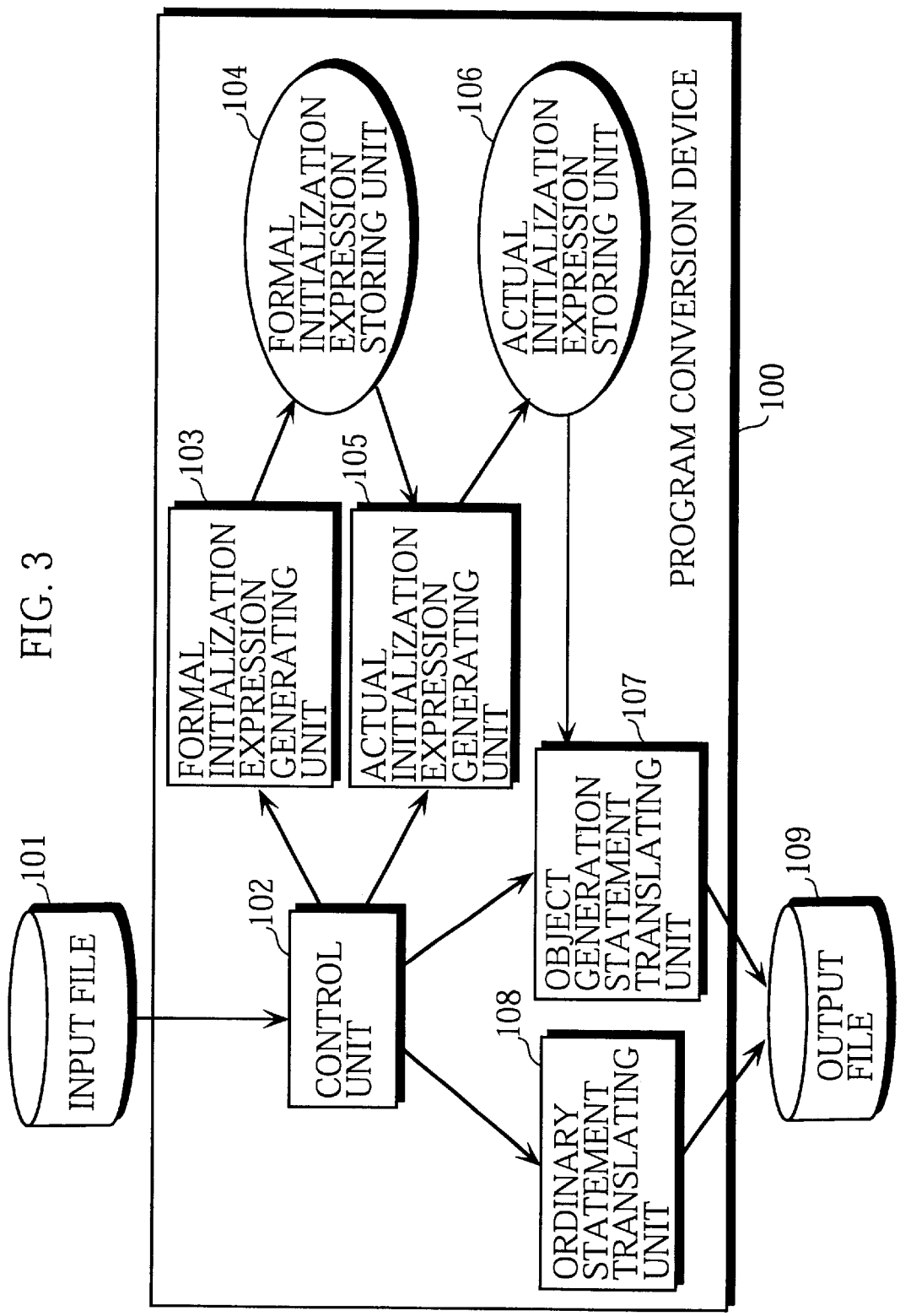
FIG. 3 shows a construction of program conversion device 100 of the present invention.

FIG. 3 shows the construction of program conversion device 100 of the present invention.

Program conversion device 100 is a compiler that translates a source program into a machine language program. This is achieved by having the CPU of a computer execute a program stored in its memory.

Program conversion device 100 comprises the following functional units: control unit 102; formal initialization expression generating unit 103; formal initialization expression storing unit 104; actual initialization expression generating unit 105; actual initialization expression storing unit 106; object generation statement translating unit 107; and ordinary statement translating unit 108.

When program conversion device 100 is realized by a program stored in a memory of a computer, control unit 102 corresponds to a main routine of the program, and units 103, 105, 107, and 108 correspond to subroutines.

FIG. 3 also shows input file 101 and output file 109 in addition to program conversion device 100. Input file 101 contains a source program written in an OOL. Output file 109 stores a machine language program that program conversion device 100 generates by translating input file 101.

Control unit 102 reads the source program from input file 101 into the memory, focuses on the statements in the read source program one at a time in order, and chooses a suitable process according to the type of the statement in focus. That is to say, control unit 102 activates one of units 103, 105, 107, and 108 according to the type of the statement in focus. Here, the "statement in focus" simply means the statement currently being processed, which may be indicated using a pointer or the like.

When activated by control unit 102, formal initialization expression generating unit 103 performs the processing to generate a formal initialization expression. More specifically, formal initialization expression generating unit 103 focuses on the definition of an object generation function, generates a formal initialization expression if it is possible, and places the generated formal initialization expression and the name of the object generation function as a pair into formal initialization expression storing unit 104. This processing will be explained later in detail. Here, the formal initialization expression expresses member variables of an object using only formal parameters and constants contained in the object generation function. The name of the object generation function includes its class name and information about the number of the formal parameters contained in the object generation function. The formal initialization expression will be explained later.

Formal initialization expression storing unit 104 is a certain memory area.

When activated by control unit 102, actual initialization expression generating unit 105 generates an actual initialization expression. More specifically, actual initialization expression generating unit 105 focuses on an object generation statement and generates, if a pair of the name of the object generation function to be invoked by the object generation statement in focus and the corresponding formal initialization expression is stored in formal initialization expression storing unit 104, an actual initialization expression by replacing formal parameters in the stored formal initialization expression with actual parameters contained in the object generation statement currently in focus. If the generated actual initialization expression is represented by constants, actual initialization expression generating unit 105 places the actual initialization expression and the information specifying the object generation statement in focus as a pair into actual initialization expression storing unit 106. This processing to generate an actual initialization expression is described later in detail.

Actual initialization expression storing unit 106 is a certain memory area.

When activated by control unit 102 after the process of actual initialization expression generating unit 105, object generation statement translating unit 107 translates the object generation statement. That is to say, object generation statement translating unit 107 focuses on the object generation statement, and if a pair of the information specifying the object generation statement in focus and the corresponding actual initialization expression is stored in actual initialization expression storing unit 106 and the object generation statement generates a const object, object generation statement translating unit 107 translates the object generation statement in focus into object data with the ROM attribute. If the pair is stored but the object generation statement in focus does not generate a const object, object generation statement translating unit 107 translates the object generation statement into object data with the RAM attribute. On the other hand, if the pair is not stored in actual initialization expression storing unit 106, object generation statement translating unit 107 translates the object generation statement in focus into object data with the RAM attribute and a subroutine call code sequence to invoke the corresponding object generation function. After the translation, object generation statement translating unit 107 outputs the translated machine code to output file 109. This processing to translate an object generation statement into machine code is described later in detail.

When activated by control unit 102, ordinary statement translating unit 108 translates ordinary statements, that is, all the statements except for object generation statements, into machine code and outputs it to output file 109. Ordinary statement translating unit 108 performs the same kind of translation processing as a conventional program conversion device.

Processing of Program Conversion Device 100

The following explains the processing of program conversion device 100 having the construction described above, referring to the case in which program conversion device 100 translates the C++ source program shown in FIG. 1 into machine code. This source program is stored in input file 101.

Figure 4:
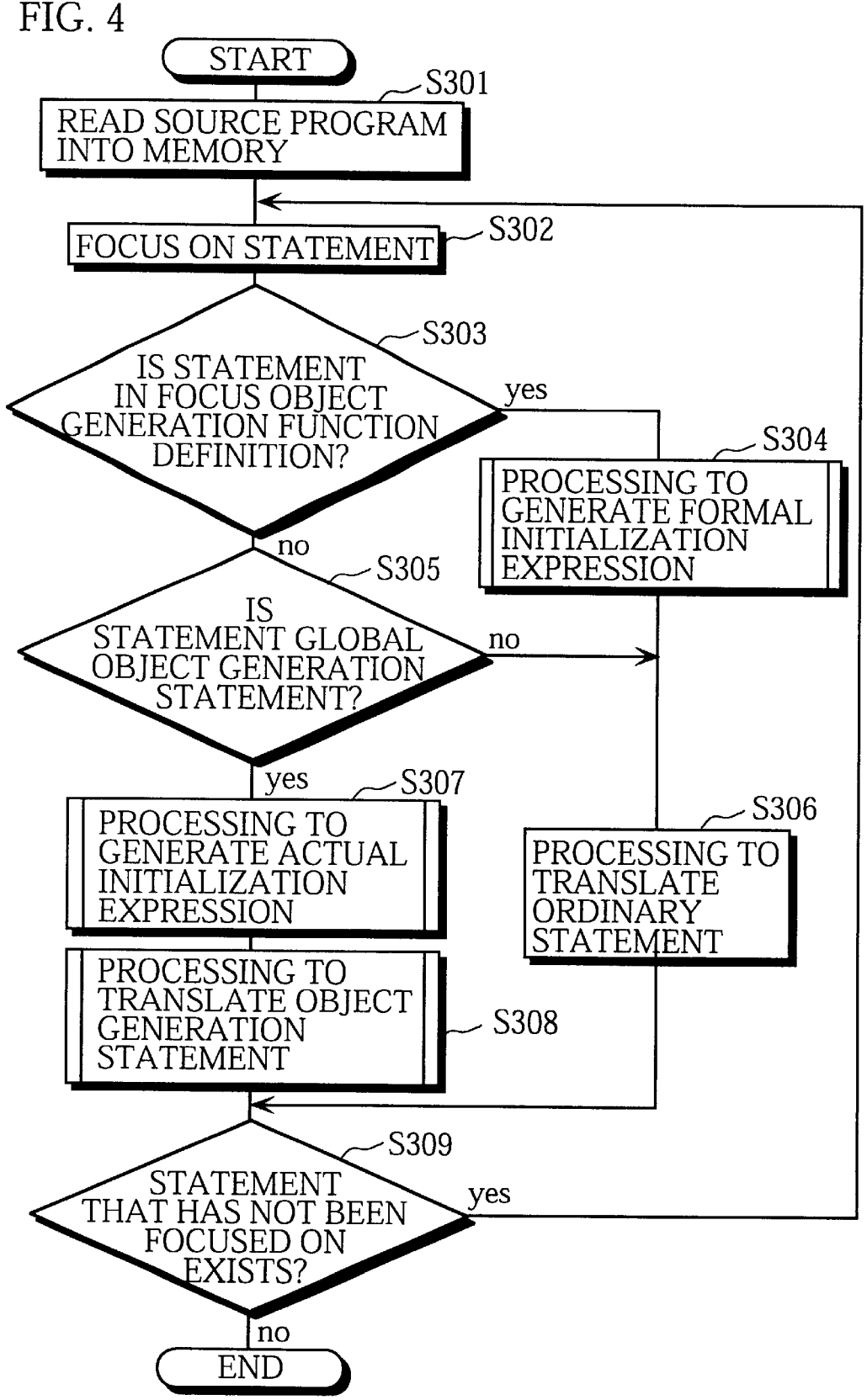
FIG. 4 is a flowchart showing the processing of program conversion device 100.

FIG. 4 is a flowchart showing the processing of program conversion device 100.

Control unit 102 reads the source program from input file 101 into the memory (step S301) and focuses on the statements in the read source program one at a time (step S302). Control unit 102 then selects the processing to be performed according to the type of the statement currently in focus (steps S303–S309).

More specifically, control unit 102 focuses on one statement in the source program (step S302), judges if the statement in focus is the object generation function definition (step S303), and if not, further judges whether the statement in focus is an object generation statement used to generate a global object (step S305). If not, control unit 102 activates ordinary statement translating unit 108 to perform the translation processing for the statement in focus (step S306). When the processing of ordinary statement translating unit 108 is completed, control unit 102 judges whether any statement that has not been focused on exists in the read source program (step S309), and if so (meaning all the statements have been processed), terminates the processing. If any statement that has not been focused on remains, control unit 102 returns the processing flow to step S302 where the statement is placed in focus.

After focusing on a statement (step S302), if the statement is judged to be an object generation function definition (step S303), control unit 102 pointer-inputs the statement in focus to formal initialization expression generating unit 103 so that formal initialization expression generating unit 103 is activated. Here, to "pointer-input" means to pass a pointer indicating a memory location of the statement in focus to the functional unit. When activated by control unit 102, formal initialization expression generating unit 103 performs the processing to generate a formal initialization expression (step S304). This processing of formal initialization expression generating unit 103 will be described in more detail later.

The above judgement in step S303 as to whether the statement in focus is an object generation function definition is made by also reading statements in front of and behind the statement in focus to confirm that the statement is contained in a class definition and includes the name of the class. Such judgement processing by control unit 102 is based on a common method used in ordinary program conversion devices.

When control unit 102 focuses on the source program shown in FIG. 1, for instance, formal initialization expression generating unit 103 is activated when control unit 102 focuses on the object generation function definition of "X (int a, int b) {x=a; y=b; z=a*b;}".

After the processing to generate a formal initialization expression (step S304) is completed, control unit 102 pointer-inputs the object generation function definition in focus to ordinary statement translating unit 108 so that ordinary statement translating unit 108 is activated. Ordinary statement translating unit 108 then translates the pointer-inputted object generation function definition into machine code (step S306).

Following this, control unit 102 judges whether any statement that has not been focused on exists in the source program (step S309). In FIG. 1, the source program contains an object generation statement that has not been focused on, so control unit 102 focuses on this object generation statement of "const X obj (2,3);" (step S302).

Control unit 102 judges that the object generation statement of "const X obj (2,3);" is not an object generation function definition (step S303), and so the processing moves to step S305, where the "yes" judgement is given as "const X obj (2,3);" is an object generation statement. Following this, control unit 102 pointer-inputs the object generation statement in focus to actual initialization expression generating unit 105 to activate actual initialization expression generating unit 105 and have it generate an actual initialization expression (step S307). This processing to generate an actual initialization expression will be described later.

After the processing in step S307 is completed, control unit 102 pointer-inputs the object generation statement in focus to object generation statement translating unit 107 to activate object generation statement translating unit 107 and have it translate the pointer-inputted object generation statement (step S308). This processing of object generation statement translating unit 107 will be explained later.

In this way, program conversion device 100 translates each statement in the source program into machine code by having control unit 102 select appropriate processing for each statement in order.

The following describes the processing of formal initialization expression generating unit 103 (step S304), actual initialization expression generating unit 105 (step S307), and object statement translating unit 107 (step S308). The processing of ordinary statement translating unit 108 (step S306) will not be explained as it performs a conventional translation procedure used in a standard program conversion device as mentioned earlier.

Processing of Formal Initialization Expression Generating Unit 103

Figure 5:
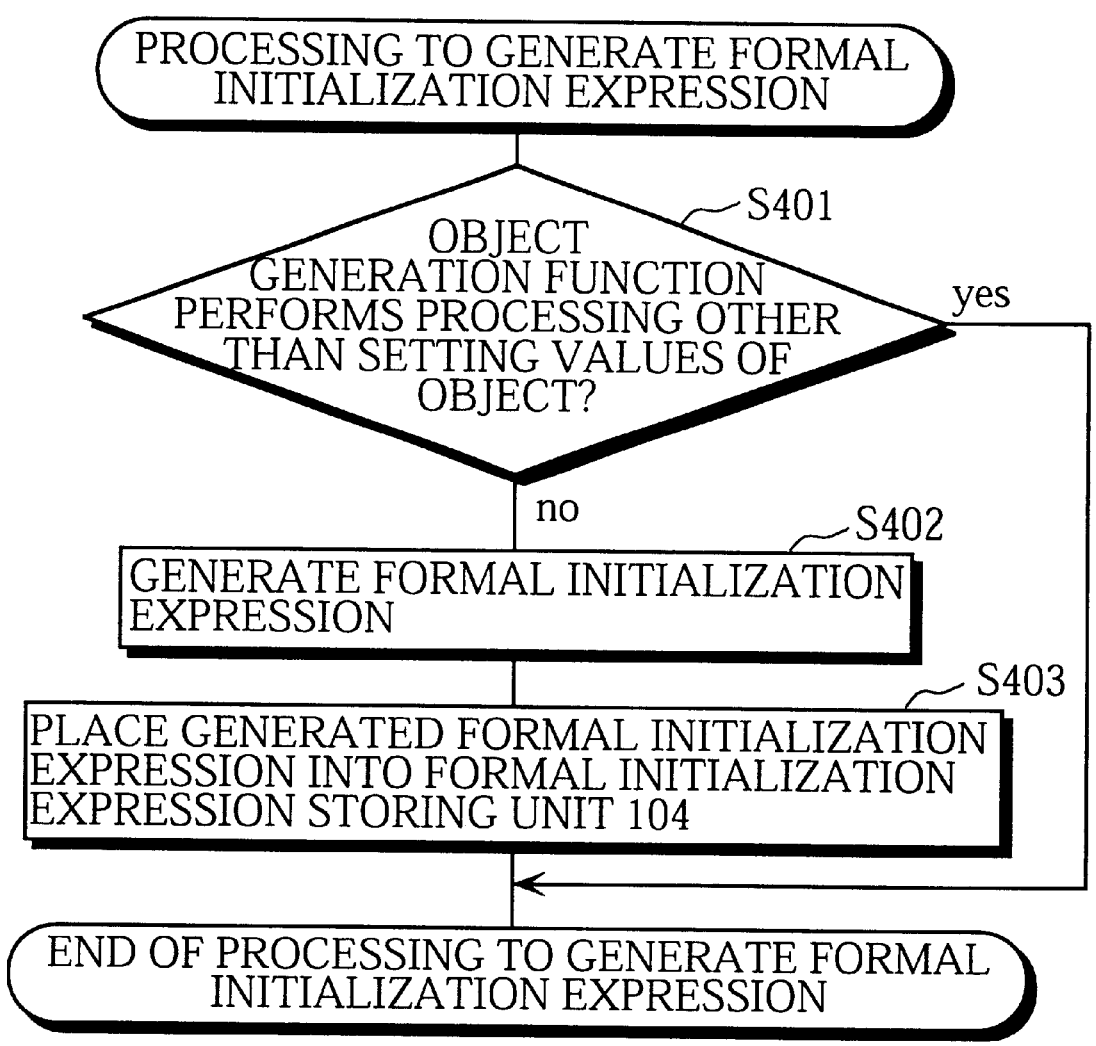
FIG. 5 is a flowchart showing the processing of formal initialization expression generating unit 103.

The following explains the processing of formal initialization expression generating unit 103 with reference to FIG. 5 that is a flowchart showing this processing.

When control unit 102 pointer-inputs an object generation function definition to formal initialization expression generating unit 103, formal initialization expression generating unit 103 is activated.

The following explanation is given with reference to a case where formal initialization expression generating unit 103 is pointer-inputted object generation function "X (int a, int b) {x=a; y=b; z=a*b;}" shown in FIG. 1.

Formal initialization expression generating unit 103 focuses on the object generation function definition and judges if the object generation function performs any processing other than setting values of an object (step S401).

Formal initialization expression generating unit 103 makes this judgement by referring first to the class X definition in the source program stored in the memory to detect member variables of the object, and then to the definition of object generation function to determine whether it contains statements other than value-assignment statements that set values in the detected member variables. Here, a value-assignment statement is a statement that has a member variable of the object on the left of an equal sign, and formal parameters, constants, and arithmetic operators for the object generation function definition on the right of the equal sign.

In this way, formal initialization expression generating unit 103 determines if the object generation function definition contains statements other than the value-assignment statements that set values in member variables of the object to judge whether the object generation function performs processing other than the setting of values of an object (step S401). If so, the "yes" judgement is given, and the processing of formal initialization expression generating unit 103 is terminated without generating a formal initialization expression. If not, the "no" judgement is given, and a formal initialization expression is generated (step S402).

With the definition of object generation function "X (int a, int b)" shown in FIG. 1, its definition part "{x=a;, y=b; "z=a*b;}" is made up of three value-assignment statements "x=a;", "y=b;", and "z=a*b;" that set values in member variables "x", "y", and "z", respectively. Accordingly, the "no" judgement is given in step S401, and a formal initialization expression is generated (step S402).

Figure 6:
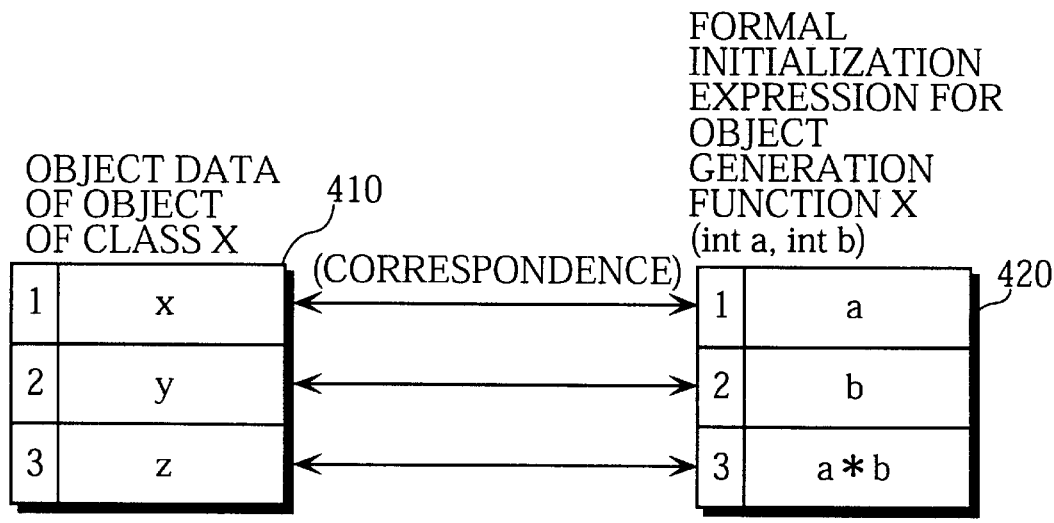
FIG. 6 is a conceptual drawing that shows a formal initialization expression generated for object generation function "X (int a, int b)" by formal initialization expression generating unit 103.

FIG. 6 is a conceptual drawing showing the formal initialization expression generated for object generation function "X (int a, int b)" by formal initialization expression generating unit 103. The figure also shows object data 410 consisting of member variables "x", "y", and "z" of an object of class X in order to show correspondence between these member variables and elements of formal initialization expression 420. In an object of class X, the first member variable is "x", the second is "y", and the third is "z". Therefore, formal initialization expression 420 for object generation function "X (int a, int b)" consists of element "a" as the first member variable, element "b" as the second member variable, and element "a*b" as the third member variable. While object generation function "X (int a, int b)" has a definition that sets values in all the member variable of an object of class X, this need not be the case. If member variables whose values are not set exist for the object, formal initialization expression generating unit 103 generates a formal initialization expression by assuming that a value "0" is set in such member variables.

After generating a formal initialization expression in this way (step S402), formal initialization expression generating unit 103 places a pair of the generated formal initialization expression and the name of the object generation function in focus into formal initialization expression storing unit 104 (step S403) and terminates its processing.

Figure 7:
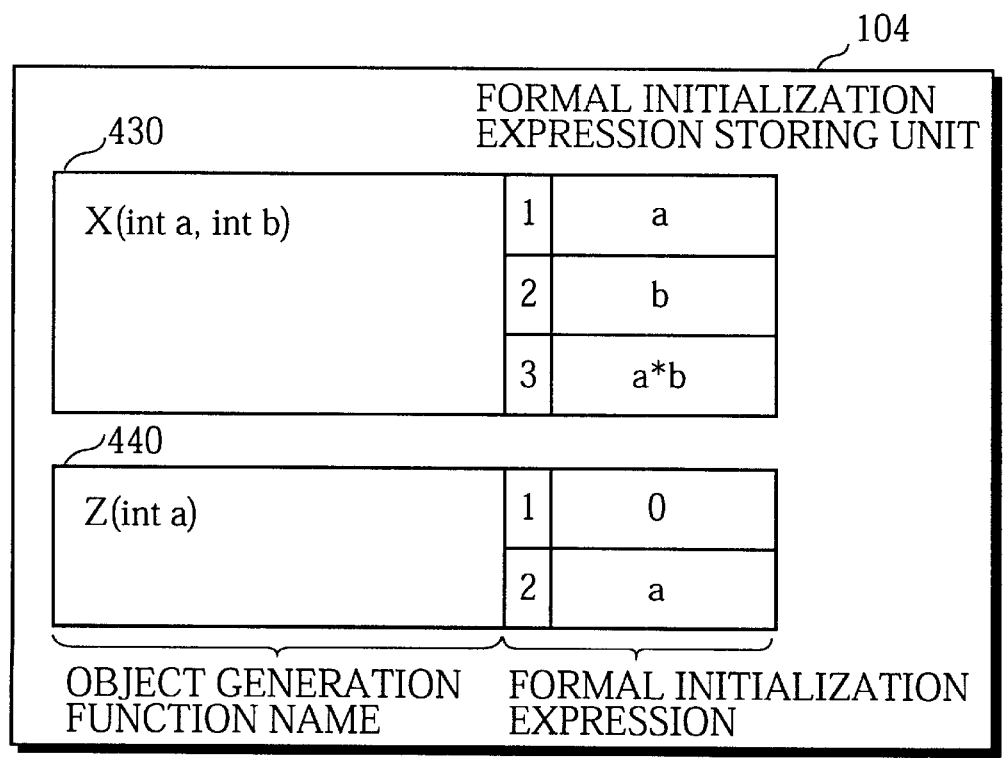
FIG. 7 is a conceptual drawing that shows the stored contents of formal initialization expression storing unit 104.

FIG. 7 is a conceptual drawing that shows the stored contents of formal initialization expression storing unit 104. The figure shows pair 430 generated for the object generation function definition "X (int a, int b) {x=a; y=b; z=a*b;}" and another pair 440, both of which have been placed by formal initialization expression generating unit 103.

Processing of Actual Initialization Expression Generating Unit 105

Figure 8:
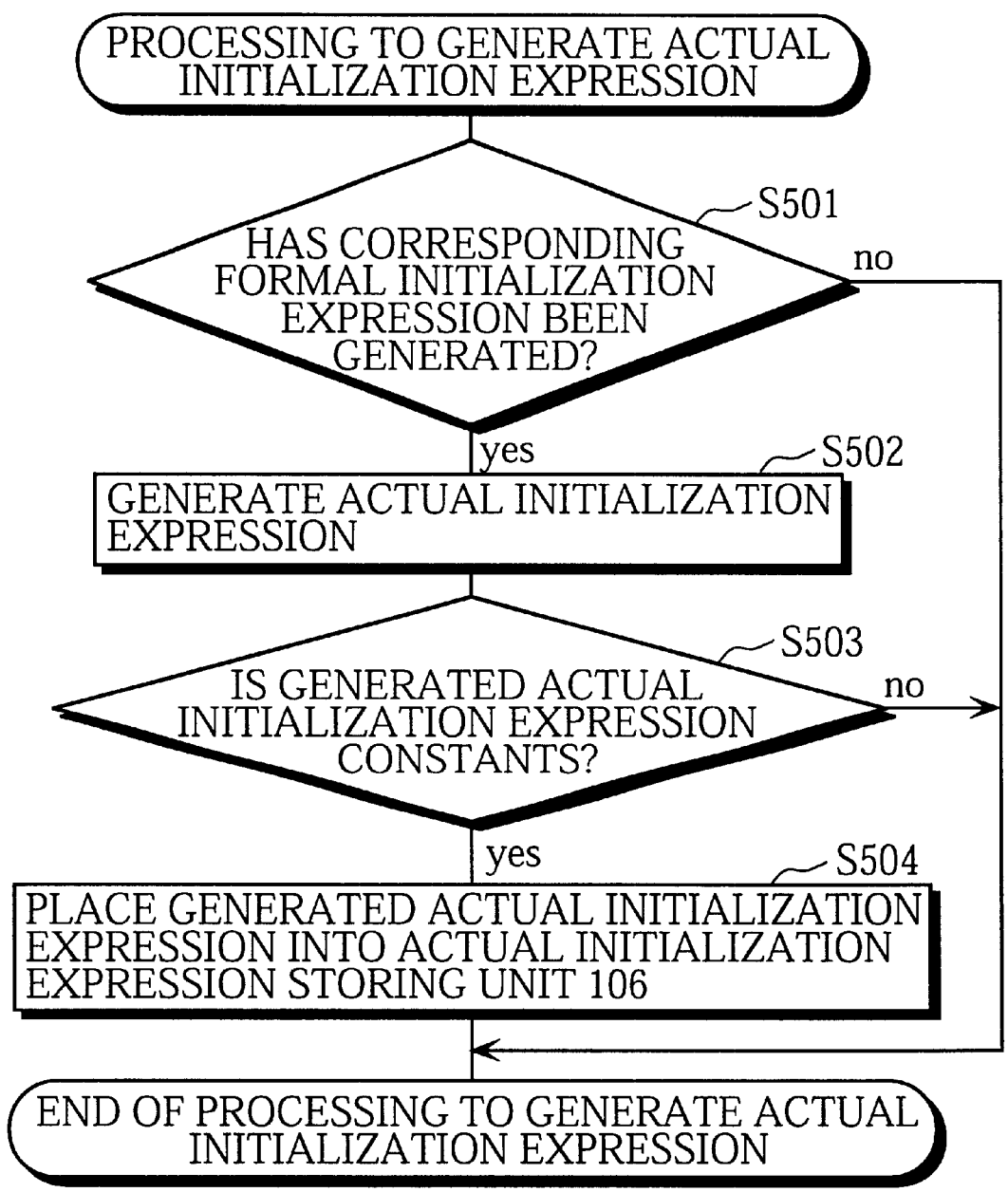
FIG. 8 is a flowchart showing the processing of actual initialization expression generating unit 106.

The following explains the processing of actual initialization expression generating unit 105 with reference to FIG. 8 that is a flowchart showing this processing.

When control unit 102 pointer-inputs an object generation statement that generates a global object to actual initialization expression generating unit 105, actual initialization expression generating unit 105 is activated.

The following explanation is given with reference to the case where actual initialization expression generating unit 105 is pointer-inputted object generation statement "const X obj (2, 3);" shown in FIG. 1.

When activated by control unit 102, actual initialization expression generating unit 105 focused on the pointer-inputted object generation statement. Actual initialization expression generating unit 105 searches formal initialization expression storing unit 104 for the name of the object generation function to be invoked by the object generation statement in focus to judge whether a pair of the name of the object generation function and the corresponding formal initialization expression is stored. By doing so, actual initialization expression generating unit 105 judges if the formal initialization expression has been generated for the object generation function to be invoked by the object generation statement in focus (step S501).

If the name is not present, the "no" judgement is given in step S501, and actual initialization expression generating unit 105 terminates its processing. On finding the name, however, actual initialization expression generating unit 105 generates an actual initialization expression by replacing formal parameters in the searched formal initialization expression with actual parameters in the object generation statement in focus (step S502).

In the case where object generation statement "const X obj (2, 3);" in FIG. 1 is referred, actual initialization expression generating unit 105 searches pair 430 in FIG. 7 and replaces formal parameters "a" and "b" in the formal initialization expression in pair 430 with actual parameters "2" and "3" in object generation statement "const X obj (2, 3);" to generate an actual initialization expression. This is to say, the generated actual initialization expression consists of three elements of "2" as the first member variable, "3" as the second, and "2*3" as the third.

After generating an actual initialization expression, actual initialization expression generating unit 105 judges if all the elements making up the actual initialization expression are constants (step S503). When such an element contains arithmetic operators, actual initialization expression generating unit 105 makes this judgement by determining whether the resulting value of the calculation based on the arithmetic operators is a constant.

If each element constituting the generated actual initialization expression is judged to be a constant in step S503, actual initialization expression generating unit 105 places the generated actual initialization expression and information specifying this object generation statement as a pair into actual initialization expression storing unit 106 (step S504), and the processing of actual initialization expression generating unit 105 is terminated.

Note that before placing such a pair into actual initialization expression storing unit 106, actual initialization expression generating unit 105 replaces elements of the actual initialization expression that contain arithmetic operators with results of calculations based on the arithmetic operators.

Figure 9:
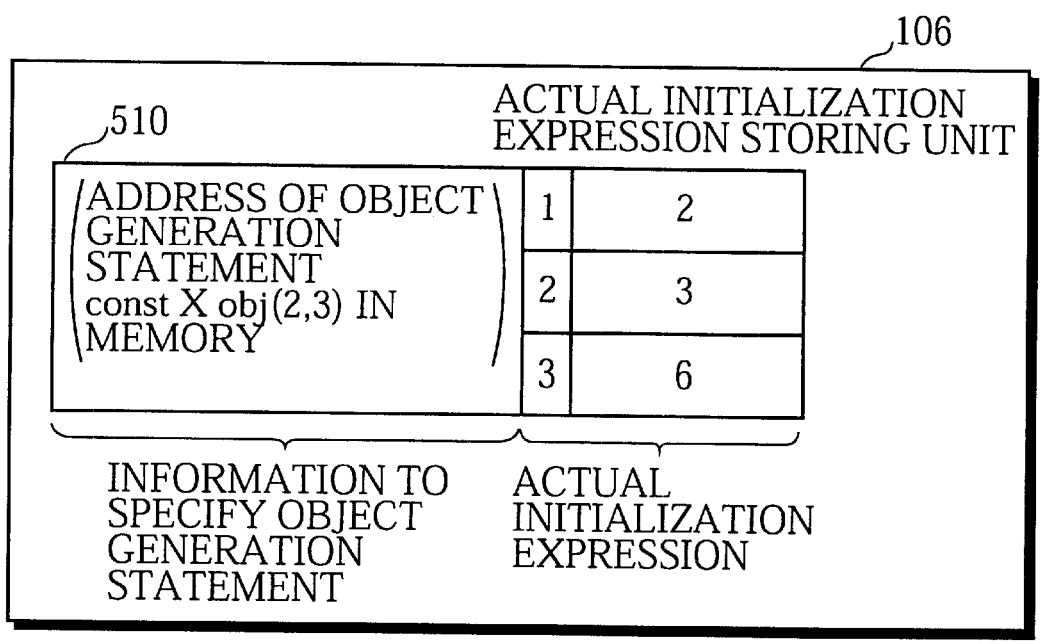
FIG. 9 is a conceptual drawing that shows the stored contents of actual initialization expression storing unit 106.

FIG. 9 is a conceptual drawing that shows the stored contents of actual initialization expression storing unit 106 after the above processing is performed. Actual initialization expression storing unit 106 stores pair 510 which has been generated for object generation statement "const X obj (2, 3);". Pair 510 consists of the actual initialization expression and the information specifying the object generation statement in focus, the information being a pointer value indicating the memory location of this object generation statement in the source program stored in the memory.

On the other hand, if the generated actual initialization expression is judged to contain elements other than constants (step S503), actual initialization expression generating unit 105 terminates its processing without placing the generated actual initialization expression into actual initialization expression storing unit 106.

Processing of Object Generation Statement Translating Unit 107

Figure 10:
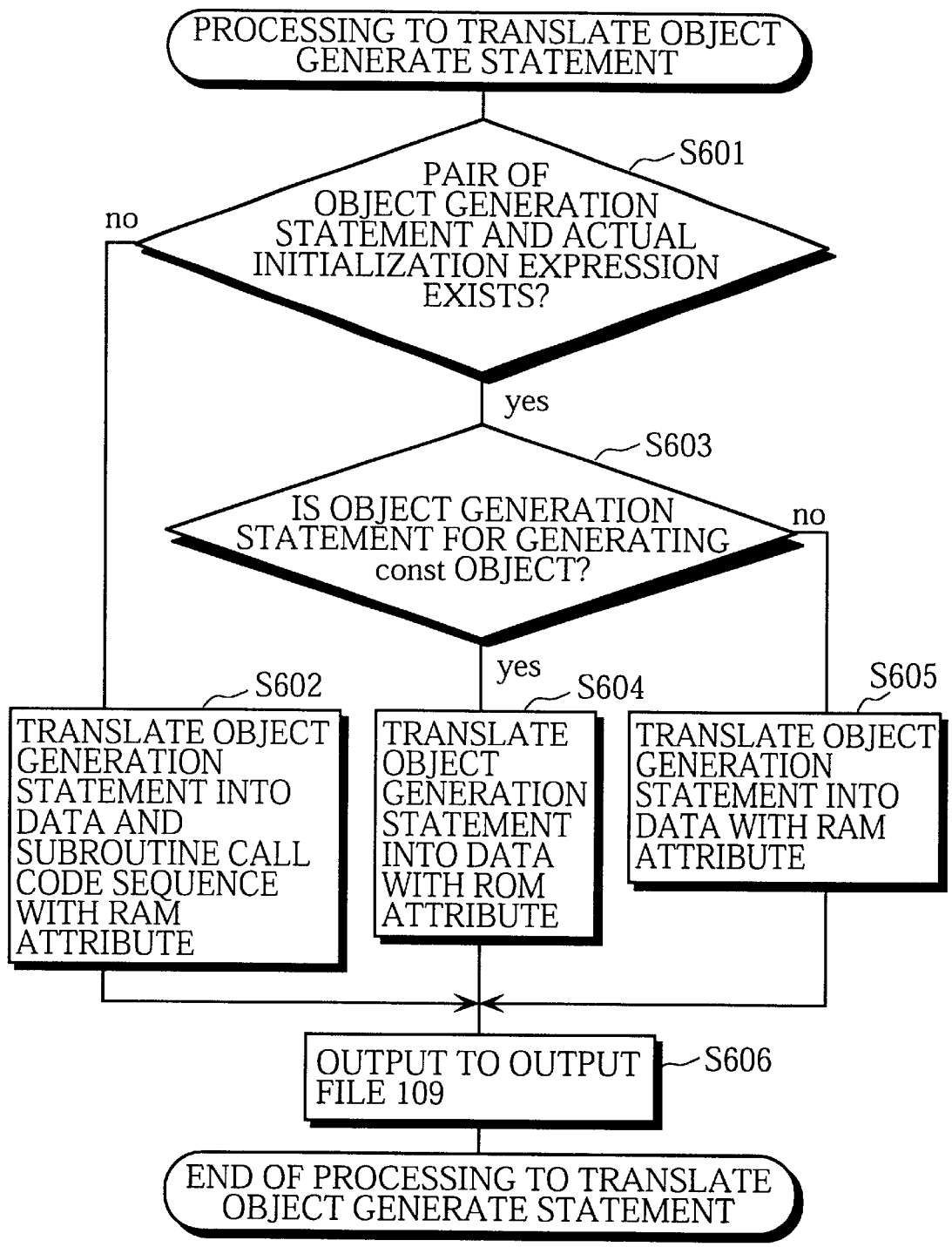
FIG. 10 is a flowchart showing the processing of object generation statement translating unit 107.

The following explains the processing of object generation statement translating unit 107 with reference to FIG. 10 that is a flowchart showing this processing.

When control unit 102 pointer-inputs an object generation statement to object generation statement translating unit 107, object generation statement translating unit 107 is activated.

The following explanation is given with reference to the case where object generation statement translating unit 107 is pointer-inputted object generation statement "const X obj (2,3);" after the processing of actual initialization expression generating unit 105 has been completed (see FIG. 4).

Object generation statement translating unit 107 focuses on the pointer-inputted object generation statement and judges whether a pair of information specifying the object generation statement in focus and the corresponding actual initialization expression is stored in actual initialization expression storing unit 106 (step S601).

If not, object generation statement translating unit 107 translates the object generation statement in focus into object data with the RAM attribute and a subroutine call code sequence that invokes the object generation function in the same way (see FIG. 2) as a conventional program conversion device (step S602).

When actual initialization expression storing unit 106 stores the contents as shown in FIG. 9, object generation statement translating unit 107 judges in step S601 that a pair of information specifying the object generation statement in focus and the corresponding actual initialization expression is stored in actual initialization expression storing unit 106. Object generation statement translating unit 107 then judges whether this object generation statement is used to generate a const object by detecting whether the object generation statement contains a "const" quantifier (step S603).

If not, object generation statement translating unit 107 translates the object generation statement in focus into object data with the RAM attribute (step S605). Unlike the translation performed in step S602, translation in this step does not generate a subroutine call instruction sequence, which means that machine code generated in step S605 is of a smaller code size than machine code that would be generated in step S602 for the same object generation statement.

When object generation statement translating unit 107 focuses on object generation statement "const X obj (2, 3);" shown in FIG. 1, the "yes" judgement is given in step S603. As a result, object generation statement translating unit 107 translates the object generation statement into object data with the ROM attribute (step S604).

When translating the object generation statement in steps S604 and S605, object generation statement translating unit 107 refers to the corresponding actual initialization expression stored in actual initialization expression storing unit 106 to ascertain the values of the object data.

FIG. 11 shows the result of the translation processing in step S604 where object generation statement "const X obj (2, 3);" is translated.

The object data of object "obj" consists of three sets of four-byte data whose values are "2", "3", and "6", respectively. This object data is placed between ".section ROMDATA" and ".section END" to indicate that it has the ROM attribute. As a result, when the finally-generated machine language program is executed, the object data of object "obj" can be placed in a ROM area. This reduces the amount of RAM necessary to execute the machine language program.

As another example, when object generation statement "X obj (2, 3);" is focused on, object generation statement translating unit 107 performs the translation processing in step S605. As a result, basically the same translation result as shown in FIG. 11 is obtained, though these two results will differ in that ".section ROMDATA" in FIG. 11 is replaced by ".section RAMDATA".

After completing the translation processing of either step S602, S604, or S605, object generation statement translating unit 107 outputs the translation result to output file 109 (step S606).

Example Modifications

The following describes example modifications to the judgement by formal initialization expression generating unit 103 as to whether an object generation function in focus performs processing other than the setting of values of an object (see step S401 in FIG. 5). The formal initialization expression generating unit used in these example modifications is hereafter called a modified formal expression generating unit.

When the modified formal expression generating unit focuses on an object generation function definition containing an object generation statement and the name of another object generation function that is invoked by this object generation statement is stored in formal initialization expression storing unit 104, the modified formal expression generating unit regards the object generation statement as a value-assignment statement in the judgement of step S401 in FIG. 5. The modified formal expression generating unit then replaces the formal parameters of the other formal initialization expression corresponding to the object generation statement with the actual parameters of the object generation statement to generate a formal initialization expression for the object generation function being judged.

The following is a more specific explanation of the above processing by the modified formal expression generating unit to generate a formal initialization expression for an object generation function containing an object generation statement.

FIG. 12 shows a part of a source program written in C++ that includes the definition of object generation function "X (int a, int b)" of class X, and the definition of object generation function "Y(int i)" of class Y. The definition of object generation function "Y(int i)" contains object generation statement "obj (i, 3)" to generate the object of class X.

First, the modified formal expression generating unit generates a formal initialization expression corresponding to object generation function "X (int a, int b)" of class X. This processing is the same as that performed by formal initialization expression generating unit 103. As a result, formal initialization expression 420 shown in FIG. 6 is generated.

The modified formal expression generating unit then generates a formal initialization expression corresponding to object generation function "Y (int i)" defined in class Y using formal initialization expression 420.

Figure 13:
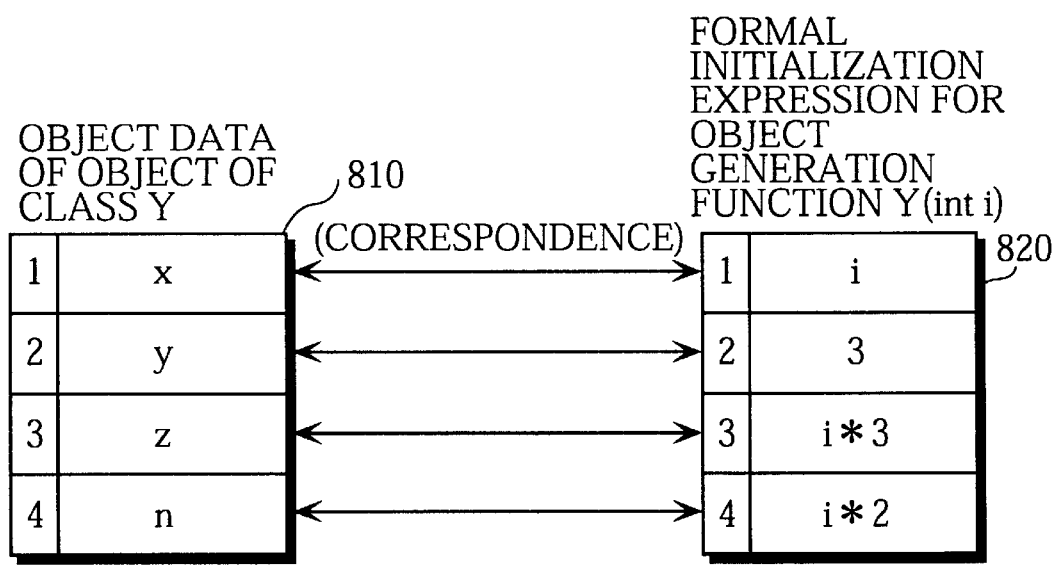
FIG. 13 is a conceptual drawing that shows a formal initialization expression generated by a modified formal expression generating unit for object generation function "Y (int i)"

FIG. 13 is a conceptual drawing showing the formal initialization expression that corresponds to object generation function "Y (int i)" and that has been generated by the modified formal expression generating unit. This figure also shows object data 810 consisting of four member variables of an object of class Y to show their correspondence with the elements making up formal initialization expression 820. Object data 810 consists of three member variables "x", "y", and "z" of a class X object that is contained in class Y definition, and one member variable "n".

Formal initialization expression 820 consists of four elements. Elements "i", "3" and "i*3" correspond to the first to third member variables of an object of class X, and are generated by replacing the formal parameters in formal initialization expression 420 shown in FIG. 6 with the actual parameters of object generation statement "obj (i, 3)" contained in object generation function "Y (int i)". On the other hand, element "i*2" corresponding to the fourth member variable "n" of an object of class Y is generated based on an expression "n=i*2;" contained in object generation function "Y (int i)".

The following describes another example modification to the above judgement (see step S401 in FIG. 5) by the modified formal expression generating unit. In a source program written in C++, when a constructor, which is an object generation function, is written as being composed of constructor initializers (ctor-initializers) and a function body (fct-body), the modified formal expression generating unit may make the above judgement based on whether the fct-body is an empty statement. If so, the modified formal expression generating unit judges that the object generation function does not perform processing other than the setting of values of an object.

Detailed explanation of constructors in a program written in C++ is given in M. A. Ellis and B. Stroustrup (1992) *The Annotated C++ Reference Manual, Japanese edition*, ISBN 4-8101-8027-1, Toppan.

By having the modified formal expression generating unit make the judgement of step S401 based on whether the fct-body is empty, the judgement can be simplified, and the execution speed of program conversion device 100 improved. To make effective use of this, constructors need to be written as being composed of ctor-initializers and a fct-body during programming.

As a reference, FIG. 14 shows a source program where the object generation functions in the source program shown in FIG. 12 are written as constructors composed of a fct-body that is an empty statement and ctor-initializers.

In each of constructors "X(int a, int b)" and "Y (int i)", ctor-initializers are written between symbols ":" and "{", and a fct-body is written between "{" and "}".

With constructor "X(int a, int b): x(a), y(b), z(a*b) {}", for instance, the fct-body is an empty statement, and ctor-initializers are "x(a)", "y(b)", and "z(a*b)", which indicate the same meaning as "x=a", "y=b", and "z=a*b", respectively.

Considerations

The following describes the effects obtained when program conversion device 100 translates a source program written in C++ into machine code and compares its translation result with that of a conventional program conversion device. Here, program conversion device 100 comprises the above modified formal expression generating unit as formal initialization expression generating unit 103 to make the judgement described in the example modifications.

FIG. 15 shows a source program written in C++ that draws a text button as one part of a graphical user interface (GUI).

In this source program, class "Point" is a class to indicate a position of a text button, and class "TextButton" is a class to define data and procedures relating to the text button. "TextButton (int i, int pi, int x, int y, int s, TextButton_RAM *dp):id(i), parent_id(pi), position(x, y), size(s), textButton_RAM(dp) {}" is a constructor, and "extern const TextButton b1 (1, 0, 7, 7, 10, &tram);" is an object generation statement used to generate const object "b1" of class "TextButton" that can be referred to from outside.

FIG. 16 shows machine code generated by the conventional program conversion device as a result of translating the source program shown in FIG. 15. In this figure, the machine code is shown by the list output representation using a quasi-assembler language, which differs from the representations used in FIGS. 2 and 11. This list output representation includes comments given after the symbols ";;".

In FIG. 16, the section shown by ".bss SECTION" indicates an area to store data with the RAM attribute, and the section shown by ".text SECTION" indicates an area to store codes with the ROM attribute. More specifically, machine code "b1" is generated in section ".bss SECTION" in order to reserve a 28-byte data area that has unspecified content values, while in section ".text SECTION", a code sequence starting with "__GLOBAL__$I00$__Fv" is generated by translating object generation statement "extern const TextButton b1 (1, 0, 7, 7, 10, &tram);" used to generate const object "b1" of class "TextButton". The code sequence starting with machine code "__GLOBAL__$I00$__Fv" includes a subroutine call instruction to invoke subroutine "__0__ct__10TextButtoniiiiP14TextButton_RAM", that has been generated by translating the constructor defined in class "TextButton". By executing this code sequence starting with machine code "__GLOBAL__$I00$__Fv", the content values are set in const object "b1".

FIG. 17 shows the machine code generated by program conversion device 100 as a result of translating the source program shown in FIG. 15. In this figure also, the machine code is represented by the list output representation used in FIG. 16. Machine code "b1" for reserving seven four-byte areas having specified content values is generated in section ".rodata SECTION". Here, section ".rodata SECTION" indicates that the data in this section has the ROM attribute. Program conversion device 100, however, does not generate a section corresponding to ".text SECTION" for the conventional program conversion device.

As is clear by comparing FIG. 16 with FIG. 17, program conversion device 100 does not generate a code sequence that needs to be executed by the CPU, and so translates the source program into much less machine code than the conventional program conversion device. In addition, all the machine code represented by the quasi-assembler language "DD" in FIG. 17 can be placed into a ROM area, since the executions of instructions by the CPU will not result in setting or updating content values of this machine code. Accordingly, program conversion device 100 of the present invention is capable of translating a source program into a machine language program that has a low execution cost.

Supplementary Explanation

The above embodiment has been used to describe the program conversion device of the present invention, although it should be clear that the present invention is not limited to this embodiment. Possible modifications are described below.

1. A source program to be translated by the program conversion device of the present invention does not have to be written in C++ as in the above embodiment, but may be written in an other OOL.

2. The above embodiment describes the translation of object generation statements used to generate global objects (see step S305 in FIG. 4). Here, if it is indicated prior to the execution of the machine language program that object data of the object to be generated by the object generation statement is to be placed into a memory area, such object is also regarded as a "global" object. This is to say, regarding the judgement in step S305 in FIG. 4 as to whether the object generation statement in focus is used to generate a global object, the program conversion device of the present invention may judge so if the object to be generated is a "global" object defined above. This judgement may be used when the source program is written in a programming language that does not distinguish between global objects and local objects.

3. The processing of program conversion device 100 shown in the flowchart of FIG. 4 has a premise that every object generation function definition is always placed ahead of a corresponding object generation statement in the source program. Here, in order to process a source program written without the above premise, program conversion device 100 may generate a formal initialization expression for every object generation function and then focus on each object generation statement to generate an actual initialization expression.

As another method, program conversion device 100 may search an object generation function to be invoked by an object generation statement and generate a formal initialization expression, only after first focusing on the object generation statement. Program conversion device 100 may then generate the corresponding actual initialization expression and translate the object generation statement.

When the above method of searching the object generation function on finding the corresponding object generation statement is used, it is also possible to obtain execution results of the object generation function by calculation based on values of actual parameters in the object generation statement, and judge whether the object generation statement should be translated into a subroutine call code sequence to invoke an object generation function. By doing so, even when an object generation function has a processing structure in which a plurality of paths exist because the processing of the object generation function can branch in accordance with values of formal parameters of the function, program conversion device 100 may refer to only a single path of the object generation function, the single path being determined by actual parameters of the corresponding object generation statement, to judge whether the object generation function performs processing other than the setting of values of an object.

4. In the above embodiment, actual initialization expression generating unit 105 examines an actual initialization expression to judge whether each element constituting the actual initialization expression is a constant (in step S503 in FIG. 8), although this judgment may be made in other ways. For instance, actual parameters in the object generation statement may be examined to judge whether they are constant.

5. In the above embodiment, formal initialization expression generating unit 103 judges in step S401 in FIG. 5 whether the object generation function definition in focus contains statements other than the value-assignment statements that set values in member variables to judge whether the object generation function performs processing other than the setting of values in member variables of an object. Here, a value-assignment statement may be a statement that substitutes a static address value into a member variable. A static address value refers to an address value that can be determined prior to the execution of the machine language program, not an address value that will be determined during the execution of the program. Alternatively, formal initialization expression generating unit 103 may judge that the object generation function does not perform processing other than setting values of the object in step S401, even when the object generation function definition contains statements other than the value-assignment statements provided such statements are assignment statements that include variables used only in the object generation function on either their right or left side.

Note that when the object generation function is judged not to perform processing other than setting values of the object for the reasons described above, the object generation function can be called a "static object generation function". A static object generation function means an object generation function whose execution result can be obtained when the program conversion device translates the source program into machine code. This operation includes substituting values into member variables, excluding such operations as calling the OS or performing an input/output whose results will not have meaning until the machine language program generated by the program conversion device is actually executed. In this way, being a "static" object generation function means that the corresponding object generation statement does not need to be translated into the subroutine call code sequence to invoke an object generation function, so that being a "static" object generation function becomes the condition for object generation functions to be judged in step S401 as not performing processing other than the setting of values of an object.

Note that if the object generation function does not perform the processing to set values in member variables of an object, formal initialization expression generating unit 103 may regard that a constant zero is substituted into member variables for generating the corresponding formal initialization expression.

6. For the judgement in step S401 of the above embodiment as to whether the object generation function performs processing other than the setting of values of an object, if the object generation function to be judged is to invoke another function, formal initialization expression generating unit 103 may make the above judgement on both the object generation function and another function to be invoked. More specifically, if the function to be invoked does not perform processing such as invoking a service of the OS or inputting/outputting but only performs operations such as making a judgement or performing a branch, then the function may be regarded as the value-assignment statement that sets values in member variables of an object.

7. The procedures such as shown in the flowcharts of FIGS. 4, 5, 8, and 10 of the above embodiment may be achieved by computer programs written in machine language, with recording media storing these programs being distributed and sold. These recording media can be IC cards, optical discs, flexible discs, ROMs, or other media, with the machine language program recorded on the media being installed into a standard computer. This standard computer executes the installed machine language program, thereby realizing the program conversion device of the above embodiment.

Also, computer programs to have standard computers perform the procedures of the above program conversion device may be distributed and sold online using communication lines and recording media such as hard disks.

What is claimed is:

1. A program conversion device that converts a source program written in an object-oriented language into a machine language program, comprising:

detecting means for detecting in the source program an object generation statement that invokes an object generation function to generate an object;

judgement means for judging whether execution of the object generation function invoked by the detected object generation statement would involve processing other than statically setting values in member variables of the object generated using the object generation statement;

member variable value calculation means for calculating, if the execution of the object generation function is judged to not involve processing other than statically setting the values in the member variables, the values that would be set in the member variables if the object generation function was executed; and converting means for converting the object generation statement into data that is of a same size as a total size of the member variables and that is the values calculated by the member variable value calculation means.

2. The program conversion device of claim 1, wherein the judgement means includes:

a formal member variable value expression generating unit which, when the object generation function invoked by the detected object generation statement does not call another function, generates, if possible, a formal member variable value expression that expresses each value to be set in the member variables using one of
(a) constants and formal parameters given in a definition of the object generation function, and
(b) formal parameters only;

an actual member variable value expression generating unit for generating, if a formal member variable value expression corresponding to the detected object generation statement has been generated by the formal member variable value expression generating unit, an actual member variable value expression by replacing formal parameters in the formal member variable value expression with actual parameters contained in the object generation statement; and a constant value detection unit for detecting whether the actual member variable value expression is represented by constants, and wherein if the constant value detection unit detects that the actual member variable value expression is represented by constants, the judgement means judges that the execution of the invoked object generation function would not involve processing other than statically setting values in member variables of the object.

3. The program conversion device of claim 1, wherein if a definition of the invoked object generation function includes statements other than assignment statements that set values in member variables of the object, the judgement means judges that the execution of the object generation function would involve processing other than statically setting values in the member variables.

4. The program conversion device of claim 3, wherein if the definition of the object generation function invoked by the detected object generation statement contains a second object generation statement that invokes a second object generation function which would not involve processing other than statically setting values in member variables of an object generated using the second object generation statement, the judgement means regards the second object generation statement as an assignment statement to make the judgement.

5. The program conversion device of claim 1, wherein the object-oriented language is C++, wherein the object generation function in the source program is a constructor composed of constructor initializers and a function body, and wherein if the function body of the invoked object generation function is an empty statement, the judgement means judges that the execution of the object generation function would not involve processing other than statically setting values in member variables of the object.

6. The program conversion device of claim 1, further comprising consistency judgement means for examining the object generation statement to judge whether values of an object generated by the object generation statement will not change, the object generation statement having been detected by the detecting means, wherein if the consistency judgement means judges that values of an object will not change, the converting means converts the object generation statement into data having an attribute indicating that the data should be placed into a ROM area, and if the consistency judgement means judges that values of an object will change, the converting means converts the object generation statement into data having an attribute indicating that the data should be placed into a RAM area.

7. A computer-readable recording medium that stores a control program to have a computer perform a translation processing to translate a source program written in an object-oriented language into a machine language program, wherein the translation processing comprises:

a detecting step for detecting in the source program an object generation statement that invokes an object generation function to generate an object;

a judgement step for judging whether execution of the object generation function invoked by the detected object generation statement would involve processing other than statically setting values in member variables of the object generated using the object generation statement;

a member variable value calculation step for calculating, if the execution of the object generation function is judged to not involve processing other than statically setting the values in the member variables, the values that would be set in the member variables if the object generation function was executed; and a converting step for converting the object generation statement into data that is of a same size as a total size of the member variables and that is the values calculated in the member variable value calculation step.

* * * * *